Feb. 28, 1933.                G. S. LANE                1,899,872
                              CLUTCH DISK
                        Original Filed March 3, 1931
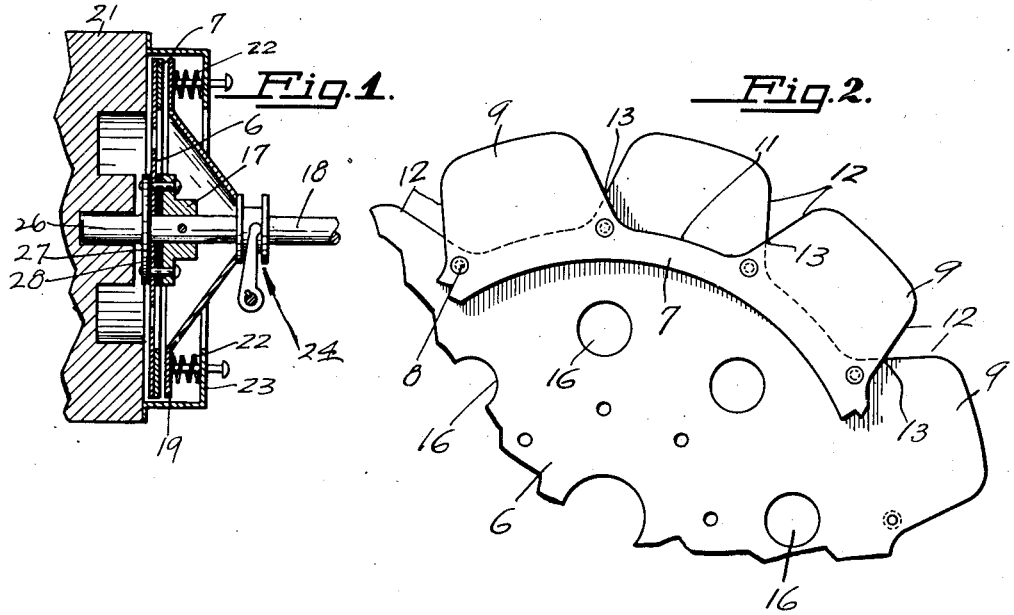
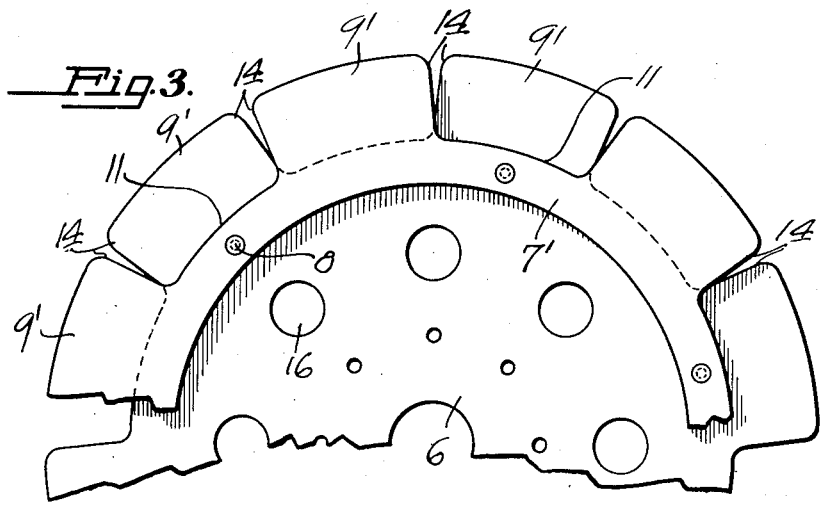
INVENTOR,
GEORGE S. LANE
BY Lincoln Johnson
ATTORNEY.

Patented Feb. 28, 1933

1,899,872

UNITED STATES PATENT OFFICE

GEORGE S. LANE, OF RIDGEWOOD, NEW JERSEY

CLUTCH DISK

Application filed March 3, 1931, Serial No. 519,728. Renewed July 22, 1932.

This invention relates to disk clutches.

It is the primary object of the invention to provide a clutch disk, the peripheral portion of which offers no resistance to compression, while the resistance to pressure gradually increases from the outer toward the inner periphery of the disk, so that at a certain radial distance from the center of the disk, it cannot be compressed, or cannot give under the pressure applied to the opposite faces of the disk.

Another object of the invention is to provide a clutch disk constructed of two plates, each of which plates has an undulated or scalloped outer periphery to form an annular series of circumferentially spaced segments; the plates being so secured to each other as to leave the outer periphery of the segments free, the resistance to pressure on said segments increasing gradually toward the inner ends thereof, whereby the resistance of the friction segments to pressure exerted thereon is corrected to decrease toward the outer periphery of the disk, at the same time the outer periphery of the disk is lightened, whereby the spinning inertia of the clutch disk is reduced.

Other objects and advantages are to provide a disk clutch that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawing, wherein

Fig. 1 is a sectional view of a clutch mechanism illustrating the use of my clutch disk.

Fig. 2 is a fragmental face view of the clutch disk of my construction; and

Fig. 3 is a fragmental face view of a modified form of the clutch disk.

In carrying out my invention I make use of a flat disk 6, on one face of which a flat full circle ring 7 is secured, by means of rivets 8. The ring 7 is disposed at the outer periphery of the plate 6. The plate 6, as well as the ring 7, has an undulated outer edge to form an annular series of friction segments 9 spaced from each other by recesses 11 between the adjacent segments 9. The recesses 11 are of substantially the same shape and size as the convex segments 9, except that the recesses 11 are inverted in shape relatively to the convex segments 9.

The segments 9 are equally spaced on both the plate 6 and the ring 7. The plate 6 and the ring 7 are parallel with each other and are so assembled face to face that the segments 9 of the plate 6 are located opposite the respective recesses 11 of the ring 7. The segments 9 shown in Fig. 2, are reduced in width from the inner toward the outer peripheries thereof. The adjacent radial edges 12 of the alternating segments 9 of the plate 6 and of the ring 7, intersect each other at 13. From the points of intersection 13 to the inner ends or roots of the segments 9, the same overlap each other. The overlapping portions of the segments are stiff and do not yield under pressure. The resistance of the segments 9 to the pressure applied thereto is gradually reduced toward the outer periphery of the segment, whereby the pressure resistance of the disk is corrected. It is to be noted that the overlapping portions of the edges 12 are approximately one-third of the entire length of the respective edges 12.

The embodiment of the disk illustrated in Fig. 3 is similar to the first mentioned embodiment, except that the side edges 14 of each segment 9' are parallel with each other. Furthermore, the adjacent side edges 14 intersect at a point close to the roots of the segments 9'.

The plate 6 is rendered more flexible by the provision of apertures 16 which are arranged annularly within the inner periphery of the ring 7.

The clutch disk heretofore described is used in the manner illustrated in Fig. 1. The plate 6 is fixedly attached to a collar 17 fixed on the driven shaft 18. The plate 6 is normally pressed by a pressure plate 19 against the face of the fly-wheel 21. The pressure plate 19 in turn is urged into operative position by means of coil springs 22 within the clutch cover 23 and bearing against the latter. The usual clutch release mechanism 24 is adapted to move the pressure plate 19 away from the disk, to disengage the clutch.

In order to prevent undue vibration to be transmitted thru the shaft 18, I provide a flanged tail shaft 26, journaled in the center of the fly-wheel 21 in continuation of the driven shaft 18. The hub of the plate 6 is fixedly secured between the flange 27 of the tail shaft 26 and the collar 17. A compressible, preferably rubber compound, friction dampener 28 is mounted on the side of the hub of the plate 6.

In operation the action of the pressure plate 6 on the ring 7 causes the flexing and bending of the plate 6, so that a ring-like peripheral portion of the latter is in frictional engagement with the face of the fly-wheel 21. Power and rotation is transmitted in this manner to the driven shaft 18.

The frictional engagement of the plate 6 and the ring 7 with the respective driving members, is properly equalized, the whining as well as chatter of the clutch is entirely eliminated, and the lightening of the outer periphery of the plate and of the ring reduces the spinning inertia of the clutch disk.

Having thus described this invention, what I claim and desire to secure by Letters Patent is:

1. In a device of the character described, a clutch disk comprising a pair of parallel flat plates, each plate having the outer periphery thereof scalloped to form a series of friction segments around the plate periphery, said plates being secured to each other face to face, the segments of one plate being located opposite the recesses of the other plate.

2. In a device of the character described, a clutch disk comprising a pair of parallel flat plates, each plate having the outer periphery thereof scalloped to form a series of friction segments around the plate periphery, said plates being secured to each other face to face, the segments of one plate being located opposite the recesses of the other plate, the edges of the alternating segments of the plates overlapping each other adjacent the inner ends thereof.

3. A clutch disk comprising a pair of plates, each having the outer edges thereof formed in the form of a series of annularly spaced segments, said plates being secured to each other face to face, the segments of one plate being located opposite the spaces between the segments of the other plate.

4. A clutch disk comprising a pair of parallel flat plates, each having the outer edges thereof formed in the form of a series of annularly spaced segments, said plates being secured to each other face to face, the segments of one plate being located opposite the spaces between the segments of the other plate.

5. A clutch disk comprising a pair of plates, each having the outer edges thereof formed in the form of a series of annularly spaced segments, said plates being secured to each other face to face, the segments of one plate being located opposite the spaces between the segments of the other plate, the side edges of the alternate segments of the opposite plates intersecting each other.

6. A clutch disk comprising a pair of plates, each having the outer edges thereof formed in the form of a series of annularly spaced segments, said plates being secured to each other face to face, the segments of one plate being located opposite the spaces between the segments of the other plate, the side edges of the alternating segments of the opposite plates overlapping each other for about one-third of their length, adjacent the inner ends thereof.

7. In a device of the character described a clutch disk comprising a pair of plates, each plate having an undulated outer periphery, segments formed by said undulations, being spaced from each other by the recesses of the undulations, said plates being secured to each other face to face so that the segments of one plate are located opposite the recesses of the other plate.

8. In a device of the character described a clutch disk comprising a plate, and a ring secured face to face to a side and adjacent the outer periphery of the plate, said plate and said ring each having undulated outer peripheries to form an annular series of friction segments, the segments of said ring being located opposite the recesses of the plate between its segments.

9. In a device of the character described a clutch disk comprising a plate, and a ring secured face to face to a side and adjacent the outer periphery of the plate, said plate and said ring each having undulated outer peripheries to form an annular series of friction segments, the segments of said ring being located opposite the recesses of the plate between its segments, said alternating opposed segments of the plate and of the ring overlapping each other at the inner corners thereof, the outer ends of said segments being free.

10. In a device of the character described a clutch disk comprising a flat plate and a flat ring secured to each other face to face, circumferentially equally spaced radial, segmental projections formed on the periphery of the plate and of the ring, said plate and said ring being so arranged that the projections on the plate are disposed in the respective spacings between the projections of the ring, the edges of the alternating friction projections overlapping each other for about one-third of their length, adjacent the inner ends thereof.

In testimony whereof, I have hereunto set my hand at San Francisco, California, this 27th day of January, 1931.

GEORGE S. LANE.